(12) United States Patent
Tervo

(10) Patent No.: US 10,782,458 B2
(45) Date of Patent: Sep. 22, 2020

(54) LARGE-FIELD-OF-VIEW WAVEGUIDE SUPPORTING RED, GREEN, AND BLUE IN ONE PLATE

(71) Applicant: Microsoft Technology Licensing, LLC, Redmond, WA (US)

(72) Inventor: Jani Kari Tapio Tervo, Espoo (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/537,127

(22) Filed: Aug. 9, 2019

(65) Prior Publication Data

US 2019/0361156 A1 Nov. 28, 2019

Related U.S. Application Data

(63) Continuation of application No. 15/639,163, filed on Jun. 30, 2017, now Pat. No. 10,393,930.

(51) Int. Cl.
*G02B 5/18* (2006.01)
*G02B 27/00* (2006.01)
*G02B 27/01* (2006.01)

(52) U.S. Cl.
CPC ............. *G02B 5/1842* (2013.01); *G02B 5/18* (2013.01); *G02B 27/0081* (2013.01); *G02B 27/0101* (2013.01); *G02B 27/0172* (2013.01); *G02B 2027/0123* (2013.01)

(58) Field of Classification Search
CPC .............. G02B 5/1842; G02B 27/0172; G02B 27/0081; G02B 27/0101; G02B 2027/0123
See application file for complete search history.

(56) References Cited

U.S. PATENT DOCUMENTS

| | | | | |
|---|---|---|---|---|
| 2010/0284085 A1* | 11/2010 | Laakkonen | ........ | G02B 27/0081 359/575 |
| 2013/0314789 A1* | 11/2013 | Saarikko | ............ | G02B 27/0081 359/489.07 |
| 2016/0116739 A1* | 4/2016 | Tekolste | ............ | G02B 27/0172 385/36 |
| 2016/0320536 A1* | 11/2016 | Simmonds | ........... | G02B 6/0016 |
| 2019/0121027 A1* | 4/2019 | Popovich | ............ | G02B 6/2726 |

* cited by examiner

*Primary Examiner* — Kimberly N. Kakalec
(74) *Attorney, Agent, or Firm* — Workman Nydegger

(57) ABSTRACT

An optical device includes a single waveguide plate. The single waveguide plate includes a first DOE including an in-coupling element having at least two periods and orientations. The optical device further includes a second DOE optically coupled to the first DOE. The second DOE includes a plurality of expansion gratings. At least one of the expansion gratings includes a plurality of wings. The optical device includes a third DOE optically coupled to the second DOE. The third DOE includes an out-coupling grating having at least two periods and orientations.

20 Claims, 11 Drawing Sheets

LARGE-FIELD-OF-VIEW WAVEGUIDE SUPPORTING RED, GREEN, AND BLUE IN ONE PLATE

CROSS-REFERENCE TO RELATED APPLICATIONS

This application is a Continuation of U.S. patent application Ser. No. 15/639,163 filed on Jun. 30, 2017, entitled "Large-Field-of-View Waveguide Supporting Red, Green, and Blue in One Plate," which issued as United States Patent No. Aug. 27, 2019 on U.S. Pat. No. 10,393,930, and which application is expressly incorporated herein by reference in its entirety.

BACKGROUND

Background and Relevant Art

Recently, there has been a resurgence in the interest in virtual reality (VR) and augmented reality (AR) devices and other such near eye devices. These devices typically include a video transmitter of some sort, such as a light engine, and optics couple to the video transmitter configured to transmit images to the eyes of the user using the devices. In particular, a user will wear a headset or similar device that includes a video transmitter optically coupled to one or more waveguides where the waveguides are configured to optically couple images out to a user.

One problem that has needed to addressing by manufacturers of such devices is a problem related to limited Field of View (FoV). In the contexts illustrated herein, the FoV is the number of degrees of visual high angle assuming a fixed eye position. Horizontally, the FoV for a human is around 135°. However, often virtual reality and augmented reality devices will have a much lower FoV available. The lower the FoV available from the device, the less realistic the experience with the device.

Technologies have been implemented which attempt to widen the FoV. One such technology is the use of diffraction gratings which spread the light by wavelength to increase the FoV. That is, a diffraction grating is dispersive, which means that it creates diffraction orders such that the colors of all non-zero orders propagate in different directions. While this behavior is highly beneficial, e.g., in spectroscopic applications, in AR/VR devices based on diffractive waveguides it is unwanted, since carrying and expanding the image content in the waveguide requires three (or in some cases two) separate waveguides unless the FoV is very small.

Having multiple waveguides greatly complicates the manufacturing process. Not only one must manufacture several waveguides but manufacturing tolerances become much tighter. In addition, one must accurately put the multiple plates in a grating stack, which adds additional manufacturing steps which require high accuracy, and increased cost.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes an optical device. The optical device includes a single waveguide plate. The single waveguide plate includes a first DOE including an in-coupling element having at least two periods and orientations. The optical device further includes a second DOE optically coupled to the first DOE. The second DOE includes a plurality of expansion gratings. At least one of the expansion gratings includes a plurality of wings. The optical device includes a third DOE optically coupled to the second DOE. The third DOE includes an out-coupling grating having at least two periods and orientations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein may include or may be used to implement a diffractive waveguide based AR/VR device that 1) carries virtual content from a light engine to the front of a user's eye and 2) expands the pupil, thus enlarging the eye box. In particular, some embodiments, can support a large FoV (e.g., 45×30°) in a single waveguide plate for multiple different wavelengths. For example, embodiments may be configured to support red, green, and blue (RGB) wavelengths with a large FoV, in a single waveguide. Thus, embodiments may carry large FoV RGB content through a single waveguide. This can be accomplished in some embodiments as now illustrated.

Some embodiments include various diffractive optical elements (DOEs) in a waveguide to accomplish the functionality described herein. In one example embodiment an incoupling grating (referred to herein as DOE1) diffracts light into two or more directions such that one spectrum of wavelengths, e.g., the red light, is diffracted primarily in a different direction(s) than another spectrum of wavelengths e.g., blue light. In the illustrated example, green light is split between these directions. This can be accomplished for example, by using a single-sided crossed grating (doubly-periodic grating) or by using linear gratings on the two surfaces of the waveguide. While the examples illustrated herein refer to the two (or more) paths through the waveguide as the red path and the blue path, it should be appreciated that other color spectrum paths may be implemented. Further, it should be appreciated that in practice, part of red light (or other colors) naturally goes through the blue path (or other colors), and vice versa.

As will be illustrated in further detail below, there are different expansion gratings (illustrated herein as DOE2) for the blue path and the red path. Both have at least one distinct wing of DOE2 but may also have more. The number of wings for DOE2 can also be unequal for these two paths.

The out-coupling grating (illustrated herein as DOE3) has two different periods and orientations (or more if multiple colors are handled separately) for the red and blue. Again, this can be done by crossed grating on one side of a grating or "crossed" linear gratings, one on each of the different surfaces of the waveguide.

Note that in components where light reaches DOE3 by multiple possible paths, each path obeys a zero summation rule separately such that the summations of vectors for each path sums to approximately zero, as illustrated in more detail below.

Thus, in general, embodiments may split the FoV of different colors into two (or more) paths, carry the partial FoVs to DOE3 while expanding the pupil by pupil replication, and at DOE3 recombining the different contributions of each color.

Additional details are now illustrated.

Figure 1:
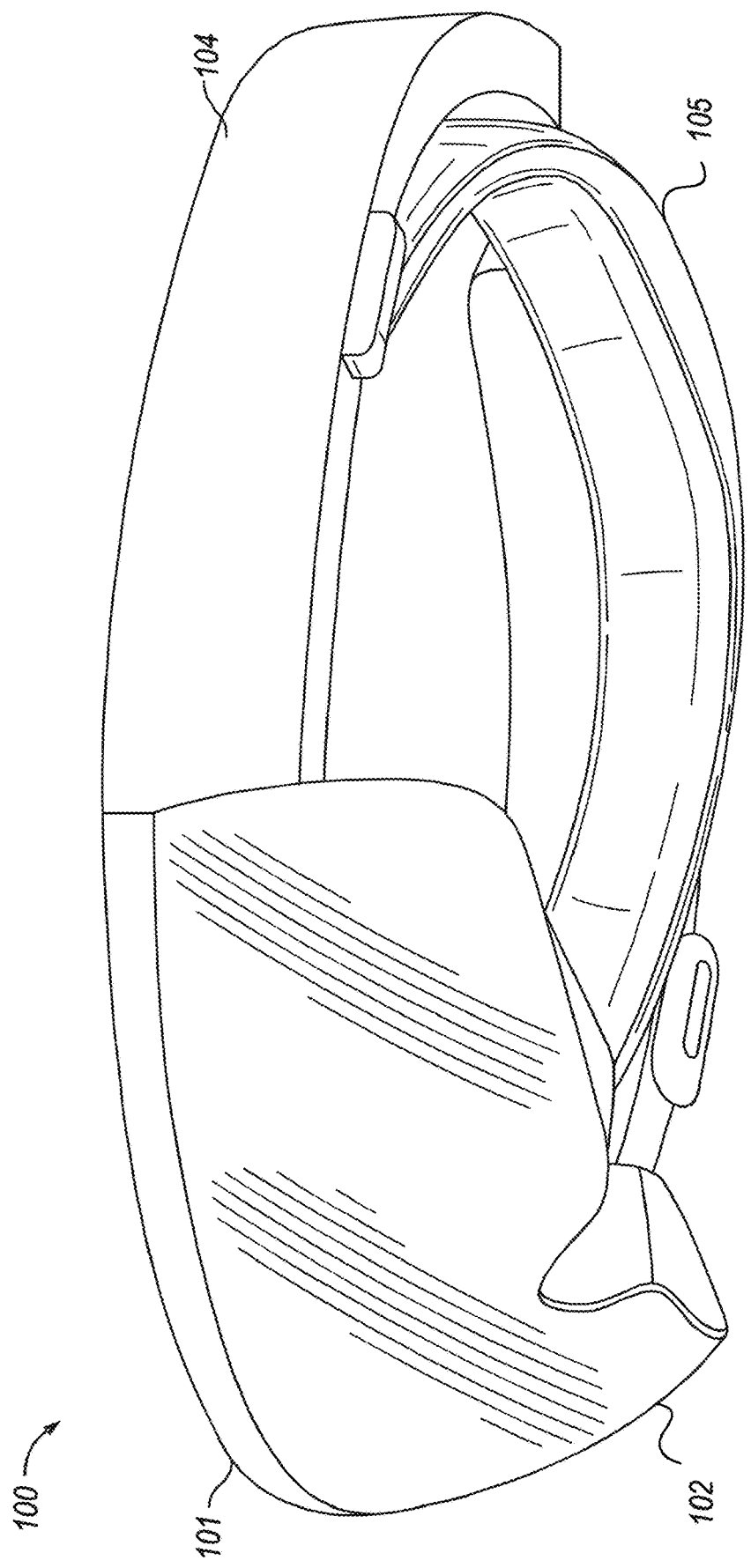
FIG. 1 illustrates an example of a near-eye display device.

FIG. 1 shows an example of a near-eye display device in which embodiments can be practiced. The near-eye display device 100 may be a virtual reality (VR) and/or augmented reality (AR) device that can provide a VR or AR experience with the user. In a VR experience, essentially the entire visual experience is provided by the VR device's light engine. In an AR experience, the light engine is used to transmit images onto a transparent protective visor. In this way, the visual experience includes elements provided by the light engine of the VR device as well as objects that can be seen visually by the user through the transparent protective visor. In the examples illustrated herein, the near-eye display device 100 is designed for AR visualization, but VR devices can be implemented using the principles illustrated.

In the illustrated embodiment, the near-eye display device 100 includes a chassis 101, a transparent protective visor 102 mounted to the chassis 101, and left and right side arms 104 mounted to the chassis 101. The visor 102 forms a protective enclosure for various display elements shown in FIG. 2.

A display assembly 200 (see FIG. 2) that can generate images for AR/VR visualization is also mounted to the chassis 101 and enclosed within the protective visor 102. The visor assembly 102 and/or chassis 101 may also house electronics to control the functionality of the display assembly 200 and other functions of the near-eye display device 100. The near-eye display device 100 further includes an adjustable headband 105 attached to the chassis 101, by which the near-eye display device 100 can be worn on a user's head.

Figure 2:
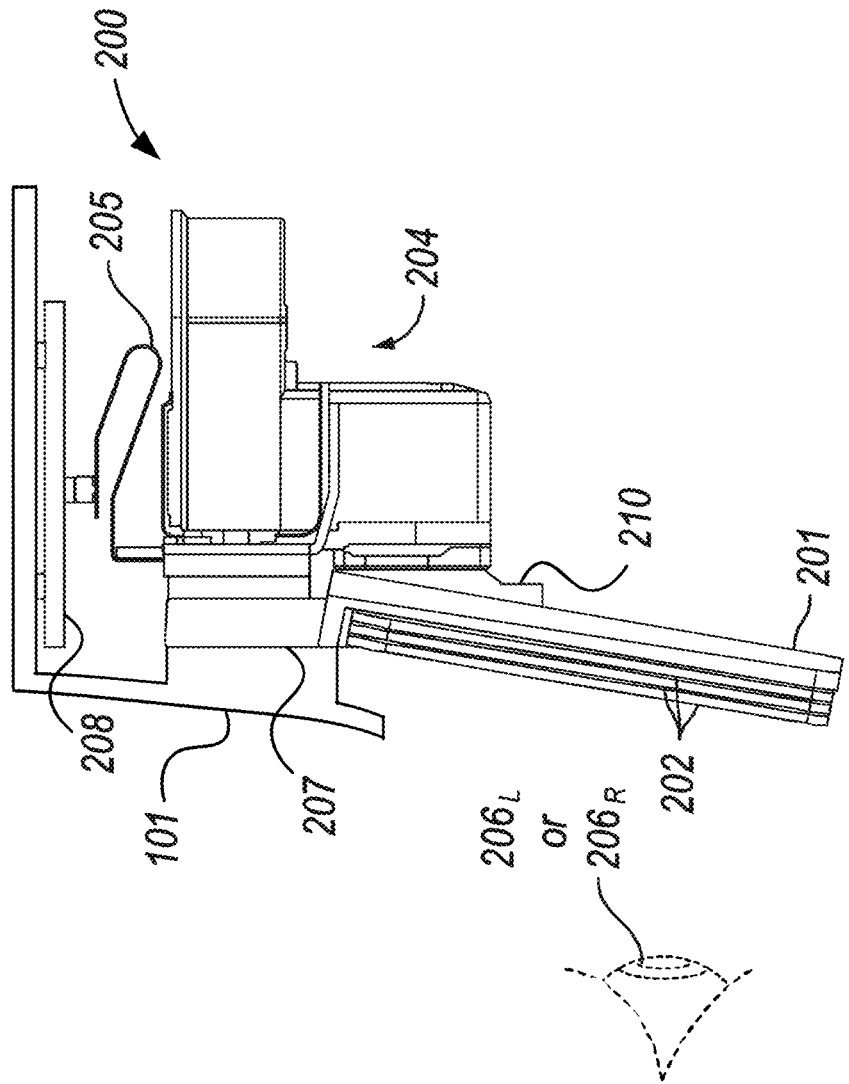
FIG. 2 illustrates various display elements.

FIG. 2 shows a side view of display components that may be contained within the visor 102 of the near-eye display device 100, in some embodiments of the invention. During operation of the near-eye display device 100, the display components are positioned relative to the user's left eye $206_L$ or right eye $206_R$. The display components are mounted to the interior surface of the chassis 101. The chassis 101 is shown in cross-section in FIG. 2.

In an AR application, the display components are designed to overlay three-dimensional images on the user's view of a real-world environment viewable through the transparent protective visor 102, e.g., by projecting light into the user's eyes. Accordingly, the display components include a display module 204 that houses a light engine including components such as: one or more light sources (e.g., one or more light emitting diodes (LEDs)); one or more microdisplay imagers, such as liquid crystal on silicon (LCOS), liquid crystal display (LCD), digital micromirror device (DMD); and one or more lenses, beam splitters and/or waveguides. The microdisplay imager(s) (not shown) within the display module 204 may be connected via a flexible circuit connector 205 to a printed circuit board 208 that has image generation/control electronics mounted on it.

The display components further include a transparent waveguide carrier 201 to which the display module 204 is mounted, and one or more output waveguides 202 on the user's side of the waveguide carrier 201, for each of the left eye and right eye of the user. Note that, ideally, embodiments are able to use a single waveguide to implement the functionality described herein. The waveguide carrier 201 has a central nose bridge portion 210, from which its left and right waveguide mounting surfaces extend. Waveguides 202 are implemented on each of the left and right waveguide mounting surfaces of the waveguide carrier 201, to project light emitted from the display module and representing images into the left eye $206_L$ and right eye $206_R$, respectively, of the user. The display assembly 200 can be mounted to the chassis 101 through a center tab 207 located at the top of the waveguide carrier 201 over the central nose bridge section 210.

The near-eye display device can provide light representing an image to an optical receptor (e.g., an eye) of a user. The user may be, e.g., a human, an animal or a machine.

Figure 3:
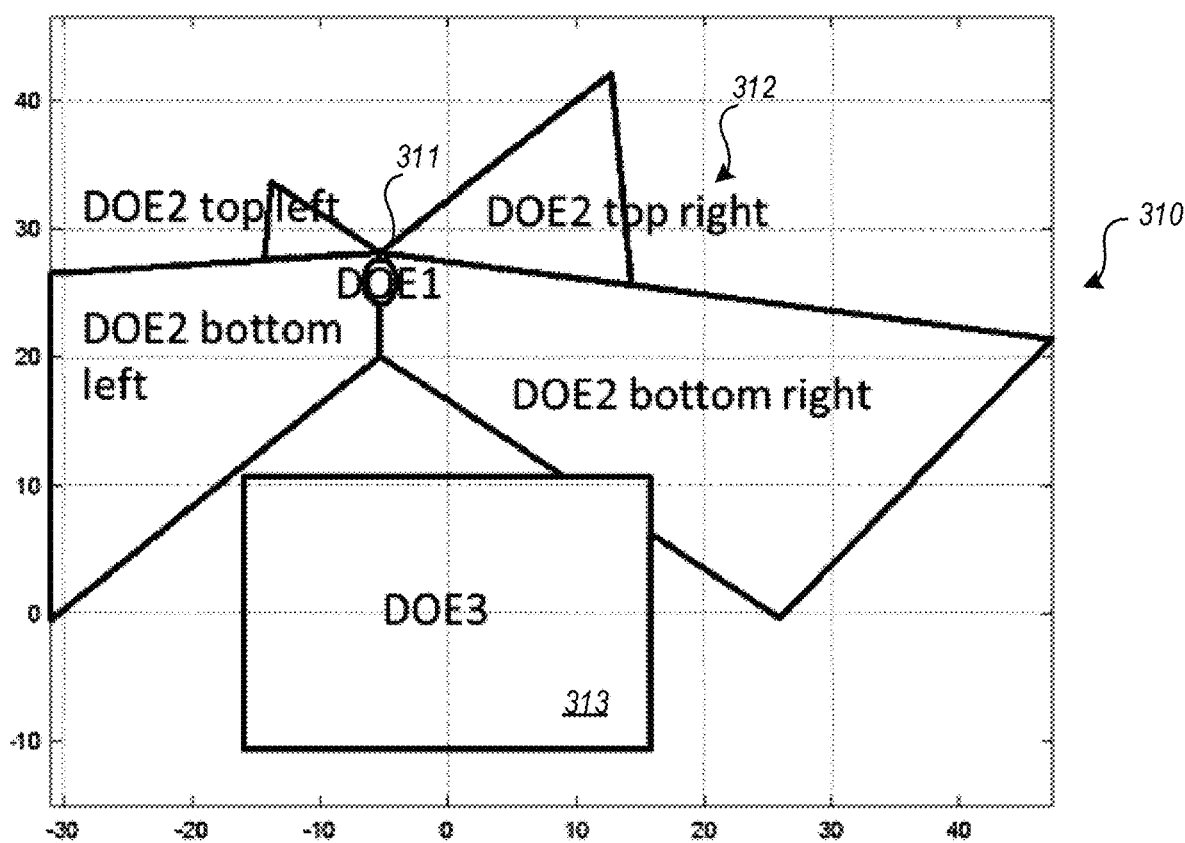
FIG. 3 illustrates a waveguide.

FIG. 3 shows an example of an output waveguide that can be mounted on the waveguide carrier 201 to convey light to one eye of the user. A similar waveguide can be designed for the other eye (or eyes), for example, as a (horizontal) mirror image of the waveguide shown in FIG. 3. The waveguide 310 is transparent (although diffractive) and, as can be seen from FIG. 2, would normally be disposed directly in front of the eye of the user during operation of the near-eye display device, e.g., as one of the waveguides 202 in FIG. 2. The waveguide 310 is, therefore, shown from the user's perspective during operation of the near-eye display device 100.

The waveguide 310 includes a single input port 311, which is a DOE indicated as DOE1 (also called in-coupling element). The input port 311 may be formed from, for example, a surface diffraction grating, volume diffraction grating, or a reflective component.

In the example illustrated herein, the input port 311 is configured to diffract input light into two or more spectra (with some leakage of the other spectra) and to diffract those two or more spectra in different directions. This causes the different spectra to take different paths on the transmission channel 312 illustrated in FIG. 3.

Figure 4A:
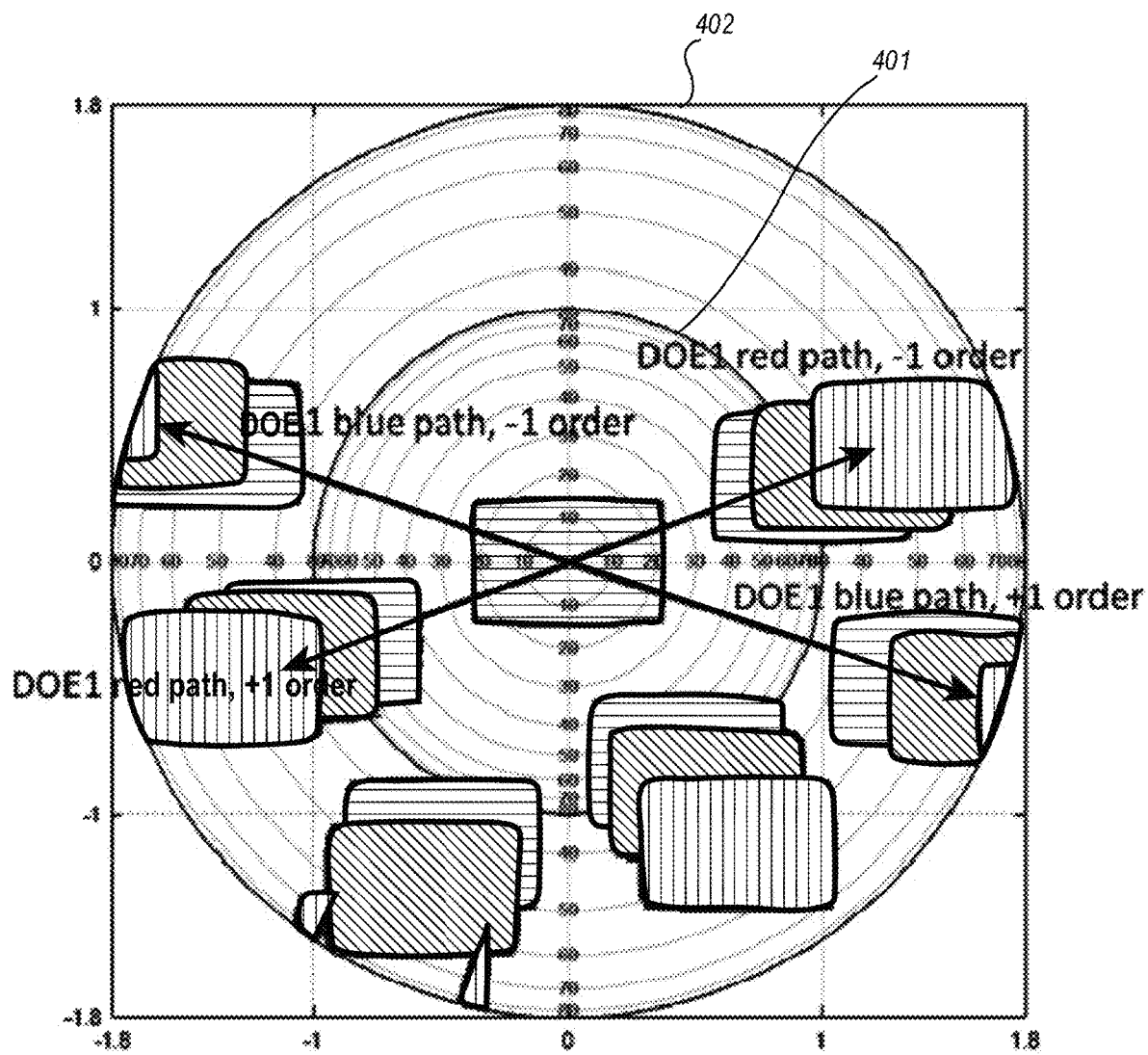
FIG. 4A illustrates a wave vector space representation.

This is illustrated in one detailed example illustrated in FIG. 4A. FIG. 4A illustrates a wave vector space representation. FIG. 4A shows a transverse wave vector space representation of light waves being diffracted by DOE1, input port 311 in the waveguide 310. The inner solid circle 401 represents the border of total internal refraction (TIR) condition. The outer solid circle 402 represents the border of evanescent waves.

Therefore, any light waves in the doughnut shaped portion between concentric circles 401 and 402 propagate in the waveguide 310 by total internal reflection (TIR). Any light waves in the inner circle 401 are waves propagate in the waveguide and then exit into the air. In other words, those light waves propagate in the waveguide and then exit from the waveguide. Any light waves outside of the outer circle 402 are evanescent waves that are not coupled into the waveguide.

FIG. 4A shows two grating vectors for DOE1 and the FOVs diffracted by DOE1 of the waveguide 310. In particular, FIG. 4A shows a DOE1 blue path, −1 order, a DOE1 red path, −1 order, a DOE1 red path, +1 order and a DOE1 blue path, +1 order.

In some embodiments, DOE1 may include a linear grating with a first grating orientation and period on the front surface of the grating and a second grating orientation and period on the back of the grating. The first grating can diffract one spectrum of light, and the second grating can diffract a second spectrum of light. Alternatively, DOE1 may include a cross grating on one side of a waveguide. The grating vectors of the cross grating may have different orientations and lengths, and they may be non-orthogonal to each other.

Referring once again to FIG. 3, the waveguide 310 includes a transmission channel 312. The transmission channel includes a DOE, referred to herein as DOE2. Note that DOE2 has several different wings, including DOE2 top left, DOE2 top right, DOE2 bottom left and DOE2 bottom right. As noted previously, DOE2 comprises a number of expansion gratings. The functionality of DOE2, will be explained in more detail below in conjunction with the description of FIGS. 5 through 7.

Figure 4B:
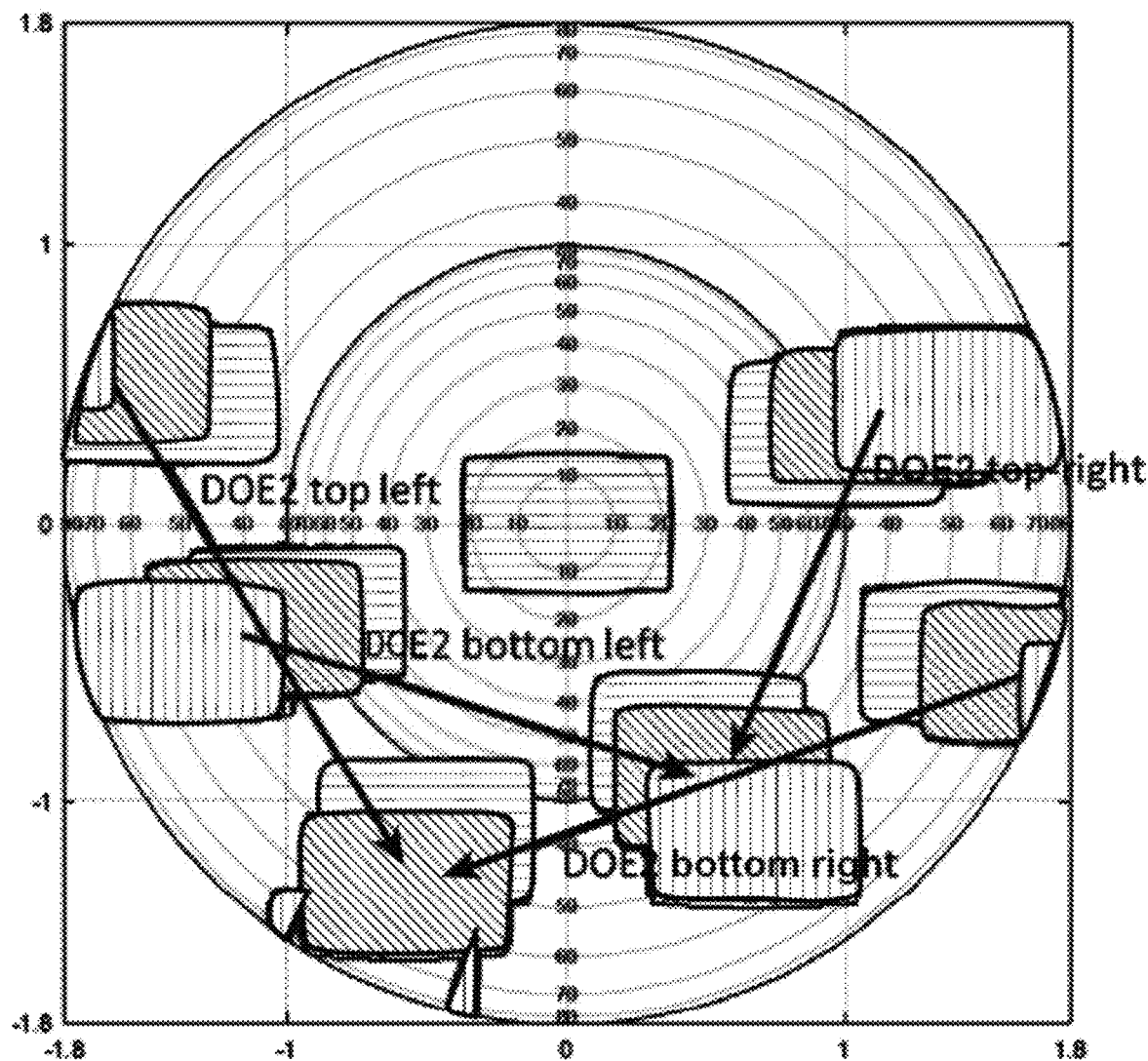
FIG. 4B illustrates a wave vector space representation.

However, reference is now made to FIG. 4B which illustrates DOE2 grating vectors and FOVs diffracted by DOE2.

Note that the various wings of DOE2 may be implemented on a grating with a first wing on the front of the grating, and a second wing on the back of the grating. In some embodiments, these first and second wings can overlap. In some embodiments, DOE2 may be a linear grating with first and second wings on the front of the waveguide. In some embodiments, DOE2 may be a linear grating with first and second wings on the back of the waveguide.

Referring once again to FIG. 3, The waveguide 310 further includes a single output port 313, which is a DOE indicated as DOE3 (also called out-coupling element).

Figure 4C:
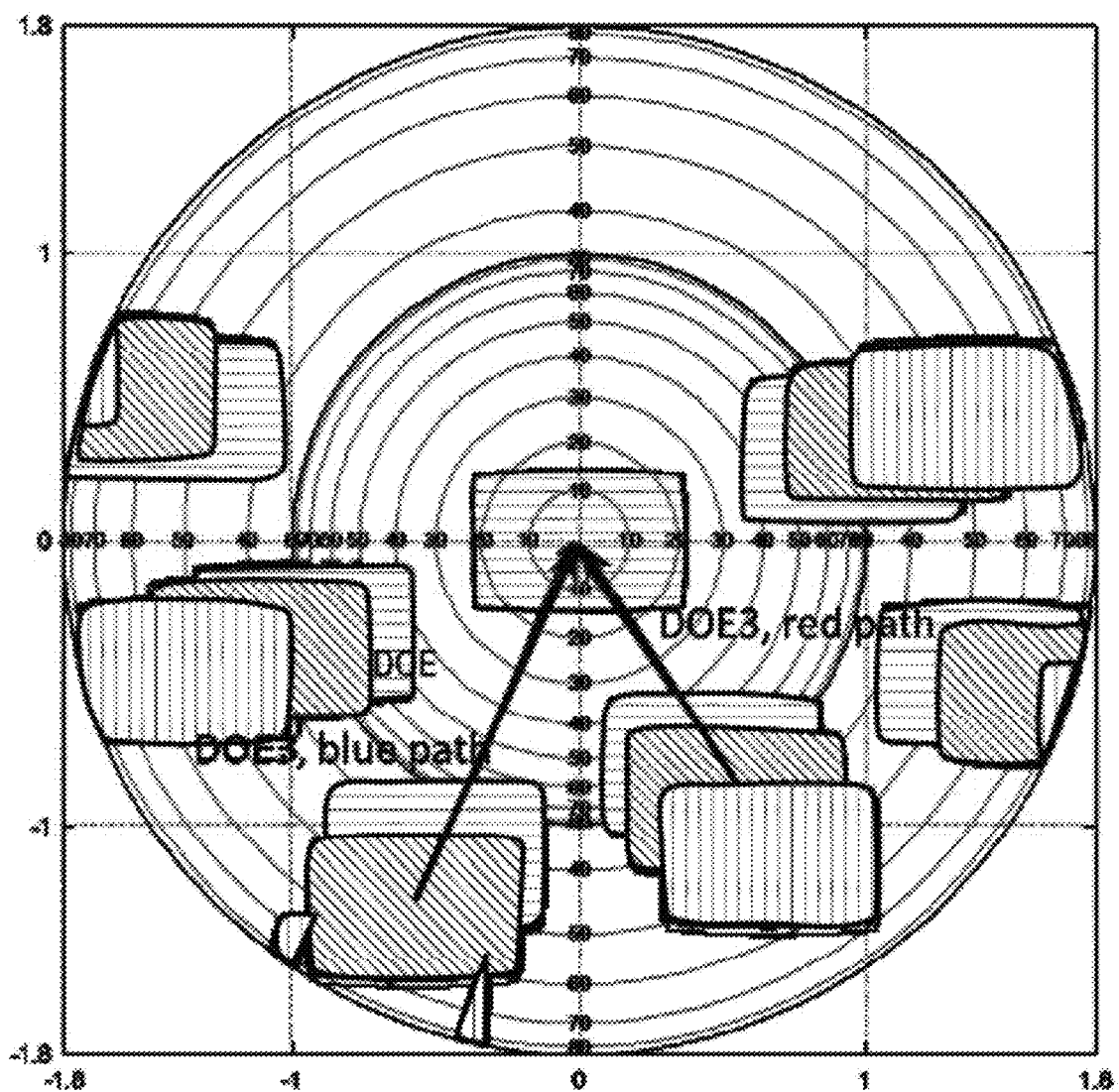
FIG. 4C illustrates a wave vector space representation.

Referring now to FIG. 4C, DOE3 grating vectors and FOVs diffracted by DOE3 are shown.

During operation, the display module 204 (see FIG. 2) outputs light representing an image for an eye from its output port into the input port 311 of the waveguide 310.

The transmission channel 312 conveys light from the input port 311 to the output port 313 and may be, for example, a surface diffraction grating, polarization grating, volume diffraction grating, or a reflective component. The transmission channel 312 may be designed to accomplish this by use of total internal reflection (TIR). Light representing the image is then projected from the output port 313 to the user's eye.

Thus, in general, embodiments may split the FoV of different colors into two (or more) paths, carry the partial FoVs to DOE3 while expanding the pupil by pupil replication, and at DOE3 recombining the different contributions of each color. Two or more paths may be identical in some parts of the path.

The grating vectors of DOEs 1, 2 and 3 satisfy $D_1+D_2+D_2=0$.

Specifically, the two grating vectors of DOE1 (for the +1 order) are denoted by D1r and D1b for "red" and "blue" paths as illustrated in the Figures above.

DOE2 grating vectors are denoted by D2tr, D2br, D2tl, D2bl for top-right, bottom-right, top-left, bottom-left, respectively Grating vectors of DOE3 are denoted by D3b and D3r Then the path equations are:

$$D1r+D2bl+D3r=0$$

$$-D1r+D2tr+D3r=0$$

$$D1b+D2br+D3b=0$$

$$-D1b+D2tl+D3b=0$$

FIG. 4A-4Cc presents an example of a k-vector map enabling this type of solution. Note that in FIG. 3, a part of both red and blue FoV appear to be leaky but this is not necessary the case in all embodiments.

The waveguide 310 may include multiple diffraction optical elements (DOEs), in order to control the directions of the light propagating in the near-eye display device via multiple occurrences of optical diffraction. The DOEs may be, for example, surface diffraction gratings or volume diffraction gratings. Various components of the waveguide 310 can be designed to contain one or more of the DOEs.

For example, the waveguide 310 may include three DOEs. The input port 311 of the waveguide 310 is a DOE1 for coupling light into the waveguide 310 and controlling the direction of light path after the light reaches the input port 311.

The transmission channel 312 of the waveguide 310 is a DOE2 for controlling the direction of light path in the transmission channel 312 and ensuring the light propagating inside of the transmission channel 312 through total internal reflection (TIR). Further, DOE2 is configured homogenize light signals in a horizontal direction The output port 313 is a DOE3 for controlling the direction of the light path after the light exits the output port 313. DOE3 configured to diffract light into an eye box keeping output propagation angles within some predetermined threshold of the input propagation angle The propagation directions of the expanded light waves are substantially parallel to each other (within some predetermined threshold). The expanded light waves are spaced or distributed along the particular direction.

In other words, the expanded light waves are translated along the particular direction (or coordinate axis) in an output waveguide before exiting the output waveguide. Each of the expanded light waves has a relatively narrow range of propagation angles or FoV. Each expanded light wave has a "propagation vector" representing the average propagation direction of the light wave and denoting a center axis of the prorogation energy of the expanded light wave. Translation of a light wave means shifting the corresponding propagation vector of the light wave along a particular direction (or coordinate axis) that is not parallel to the propagation vector itself.

Thus, the light waves exiting the output waveguide have the same direction as (i.e., are substantially parallel, within some threshold, to) the light waves entering the output waveguide for light of any given wavelength, to have the light waves follow the desired path to the optical receptor of a user. This condition is called achromatic imaging.

The following illustrates details with respect to expanding light and is directed to a single light path. However, it should be appreciated that the concepts illustrated can be applied to the different paths described above, such that expansion and the summation rules apply for each distinct path of light.

Figure 5:
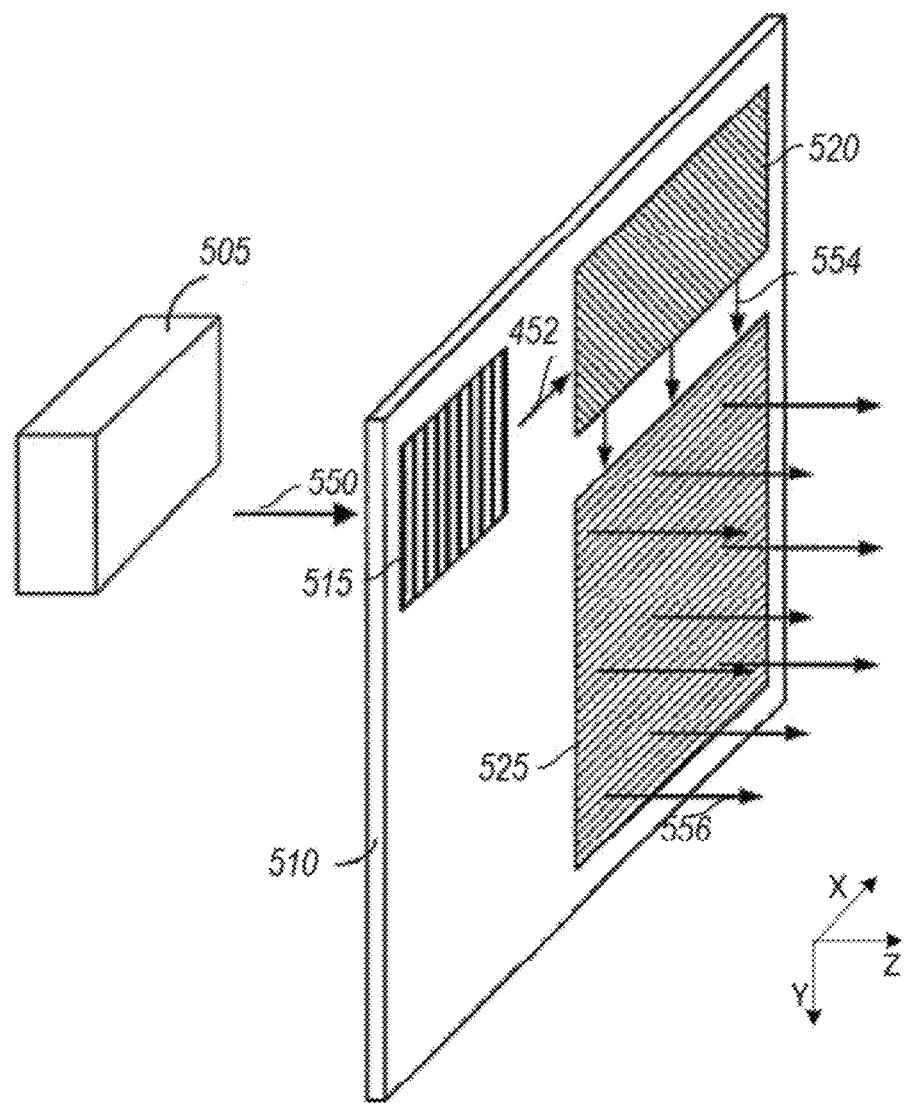
FIG. 5 illustrates an output waveguide.

The waveguide including three DOEs can expand the light waves in two dimensions. The expansion process is also referred to as exit pupil expansion. FIG. 5 shows an example of an output waveguide that expands the exit pupil of a near-eye display device. The waveguide 510 includes three DOEs 515, 520 and 525 to expand the exit pupil. The DOEs 515, 520 and 525 are successive in a common light path. The DOEs 515, 520 and 525 can be, e.g., arranged on a planar substrate.

The imager 505 (e.g., an LCOS device) outputs a light wave 550 that is incident upon the first DOE 515 in a Z direction. The DOE 515 directs the light wave 552 toward the second DOE 520. As shown in FIG. 5, the DOE 520 expands the light wave 554 in a first dimension (X dimension). As shown in FIG. 5, during the expansion, each propagation vector of the expanded light waves 554 is shifted along the X coordinate axis such that the expanded light waves are spaced or distributed in the X dimension.

The DOE 520 further redirects the expanded light wave 554 to a third DOE 525. The third DOE 525 further expands the light wave 554 in a second dimension (Y dimension), and redirects the expanded light wave 556 outward in the Z direction.

Thus, the waveguide 510 receives the input light wave 550 incident in the Z direction, expands the light wave in both X and Y dimensions, and redirects the expanded light waves in the same Z-direction. In other words, the waveguide 510 expanded light distribution in two dimensions while maintains the direction of the light wave. Thus, the waveguide 510 can be referred to as a beam-expanding device or an exit pupil expander.

Figure 6A:
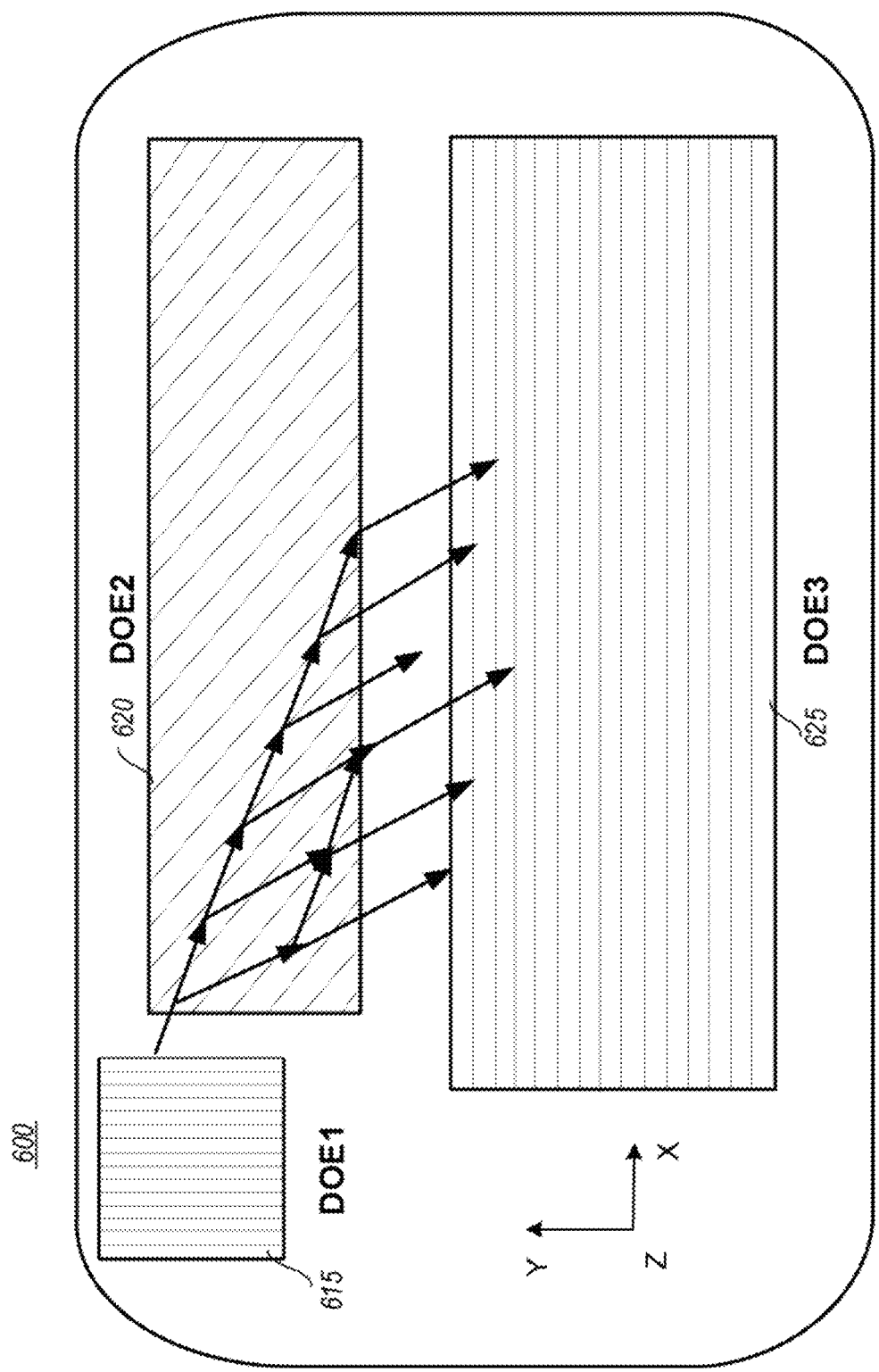
FIG. 6A illustrates a waveguide with odd-order expansion.

The waveguide, as a beam-expanding device, can expand light waves in, e.g., an odd-order expansion process or an even-order process. FIG. 6A shows an output waveguide conducting an odd-order expansion. The waveguide 600 includes DOEs 615, 620 and 625.

Each of the DOEs 615, 620 and 625 has a diffraction grating. A diffraction grating is an optical component with a periodic structure, which splits and diffracts an incident light beam into several beams travelling in different directions. The periodic structure can include linear grooves arranged in a periodic pattern. The distance between nearby grooves is called grating period d.

The diffraction grating has a property of grating vector D (also referred to as diffraction pattern vector). The grating vector D represents the direction and spacing of the grating pattern (also referred to as periodic diffraction pattern). The length of a grating vector is $D=2\pi/d$. The direction of the grating vector D is perpendicular to ("normal to" or "orthogonal to") center axes of the periodic linear grooves, where the center axes are perpendicular to the cross sections of the periodic linear grooves.

Light is incident upon the waveguide 600 in a Z direction, which is perpendicular to the X and Y directions. The first DOE 615 couples light from an imager (not shown) into the waveguide 600. The second DOE 620 expands the light in the X direction. The third DOE 625 further expands the light in the Y direction and couples the expanded light out from the waveguide 600 in the same Z direction.

As shown in FIG. 6A, the second DOE 620 receives the light wave from the first DOE 615 at a left edge (as the reader views the figure) of the DOE 620. The light wave is reflected by the grating pattern in the DOE 620 for one or more times before the light wave exits the DOE 620 at a bottom edge of the DOE 620. Because the odd-order expansion enables the second DOE 620 to receive the light wave at a side edge, a waveguide of an odd-order expansion configuration usually occupies less space than a waveguide of an even-order expansion configuration (which is discussed later).

During the odd-order expansion process, the second DOE 620 reflects (i.e., changes the direction of) the light for an odd number of times before redirecting the light into the third DOE 625. Over the process of multiple reflections between 0 and +1 diffraction orders, a greater portion of the light energy is converted to +1 order, which is redirected toward the third DOE 625.

Figure 6B:
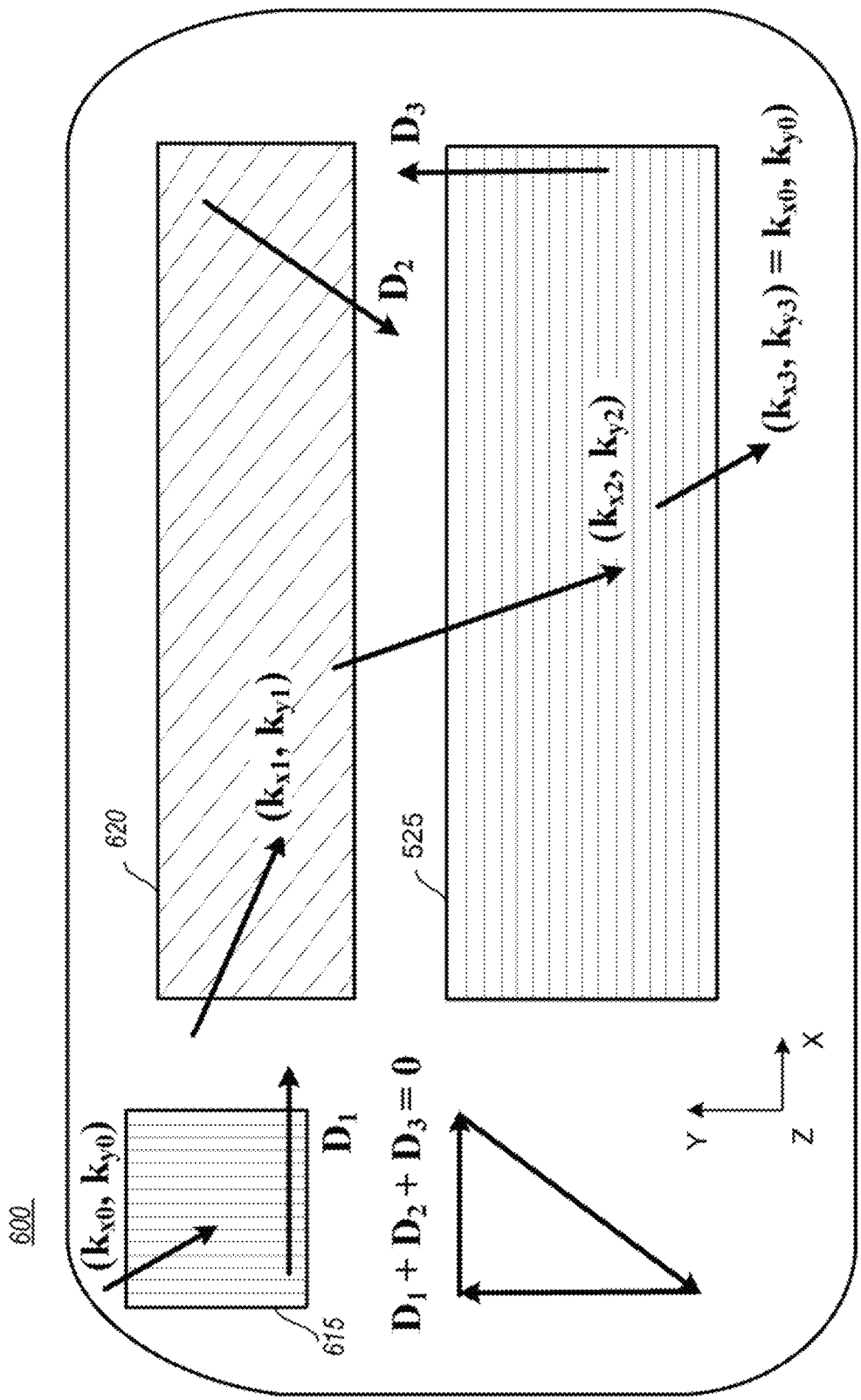
FIG. 6B illustrates a waveguide with odd-order expansion.

FIG. 6B shows the wave vectors of light propagating in the waveguide and grating vectors of DOEs of the waveguide. The incident light has a pair of transverse wave vector components $k_{x0}$ and $k_{y0}$. The magnitude of the wave vector is the wave number $k=2\pi/\lambda$, where $\lambda$ is the wavelength of the light. The wave number of the incident light in the air is denoted as $k_0$. The wave number of the light propagating in the waveguide is denoted as $k=k_0*n$, where n is the refractive index of the waveguide material.

The grating vectors of the DOE1, 2, and 3 (616, 620 and 625 in FIG. 6B) are denoted as $D_j=(D_{xj}, D_{yj})$. The DOE 615 with a wave vector of $(D_{x1}, D_{y1})$ redirects the incident light $(k_{x0}, k_{y0})$ toward the second DOE 620. Therefore, $(k_{x1}, k_{y1})=(k_{x0}+D_{x1}, k_{y0}+D_{y1})$.

The DOE 620 with a wave vector of $(D_{x2}, D_{y2})$ receives light $(k_{x1}, k_{y1})$ and redirects the light $(k_{1x}, k_{1y})$ toward the third DOE 625. Therefore, $(k_{x2}, k_{y2})=(k_{x1}+D_{x2}, k_{y1}+D_{y2})=(k_{x0}+D_{x1}+D_{x2}, k_{y0}+D_{y1}+D_{y2})$.

The DOE 625 with a wave vector of $(D_{x3}, D_{y3})$ receives light $(k_{x2}, k_{y2})$ and couples the light $(k_{x2}, k_{y2})$ out in a Z direction. Therefore, $(k_{x3}, k_{y3})=(k_{x2}+D_{x3}, k_{y2}+D_{y3})=(k_{x0}+D_{x1}+D_{x2}+D_{x3}, k_{y0}+D_{y1}+D_{y2}+D_{x3})$.

The waveguide 600 satisfies the achromatic imaging condition, which means that when the light waves with different wavelengths are expanded by the waveguide 600 and exit the waveguide 600, the exit directions of the light waves are the same as the input directions in which the light waves enter the waveguide 600. In other words, the incident light wave number $(k_{x0}, k_{y0})$ matches the out-coupled light wave number $(k_{x3}, k_{y3})$: $(k_{x0}, k_{y0})=(k_{x3}, k_{y3})$. Therefore, the grating vectors of the waveguide 600 satisfy $D_{x1}+D_{x2}+D_{x3}=D_{y1}+D_{y2}+D_{x3})=0$. Alternatively, in a vector form, a vector summation of the grating vectors equals zero: $D_1+D_2+D_2=0$ (also referred to as the "summation rule").

Note that the grating vectors $D_1$, $D_2$, $D_2$ depend on grating periods but do not depend on wavelengths of the light waves. Therefore, once the grating vectors satisfy the summation rule, the achromatic imaging condition is satisfied for light waves with any wavelengths (hence the term "achromatic imaging").

To satisfy the achromatic imaging condition, it is not necessary to restrict the diffraction gratings of first DOE 615 and the DOE 625 to have the same grating period. The summation rule relaxes the design limitations of those diffraction gratings. The relaxed design limitations enable a waveguide 600 to have a larger FoV.

Furthermore, the waveguide 600 keeps the light diffracted by DOEs 615 and 620 inside the waveguide 600. Thus, the light propagating inside of the waveguide 600 is not evanescent and satisfies condition of total internal reflection (TIR). In other words, light diffracted by DOE 615 satisfies the TIR condition inside of the waveguide: $k_{x1}^2+k_{y1}^2>k_0^2$. Light diffracted by DOE 615 is not evanescent: $k_{x1}^2+k_{y1}^2<k^2$. Light diffracted by DOE 620 also satisfies the TIR condition inside of the waveguide: $k_{x2}^2+k_{y2}^2>k_0^2$. Light diffracted by DOE 620 is not evanescent: $k_{x2}^2+k_{y2}^2<k^2$.

Although FIGS. 6A, 6B and 6C shows a waveguide including three DOEs, a waveguide according to the disclosed technology can have any arbitrary number of DOEs. For example, if a waveguide includes N number of DOEs, the condition of achromatic imaging is $D_{x1}+D_{x2}+D_{x3}+\ldots+D_{xN}=D_{y1}+D_{y2}+D_{y3}+\ldots+D_{yN}=0$. Alternatively, in a vector form: $D_1+D_2+D_2+\ldots+D_N=0$. The DOEs also satisfy the conditions for TIR and non-evanescence.

In some embodiments, the achromatic imaging condition can be expressed as a weighted vector summation of the grating vectors: $mD_1+nD_2+lD_3=0$, where the values m, n, and l in the addends are integer weight values that represent diffraction orders to which the periodic diffraction patterns are designed to concentrate light energy. In some embodiments, the integer weight values can be 0, negative, or positive.

Figure 7:
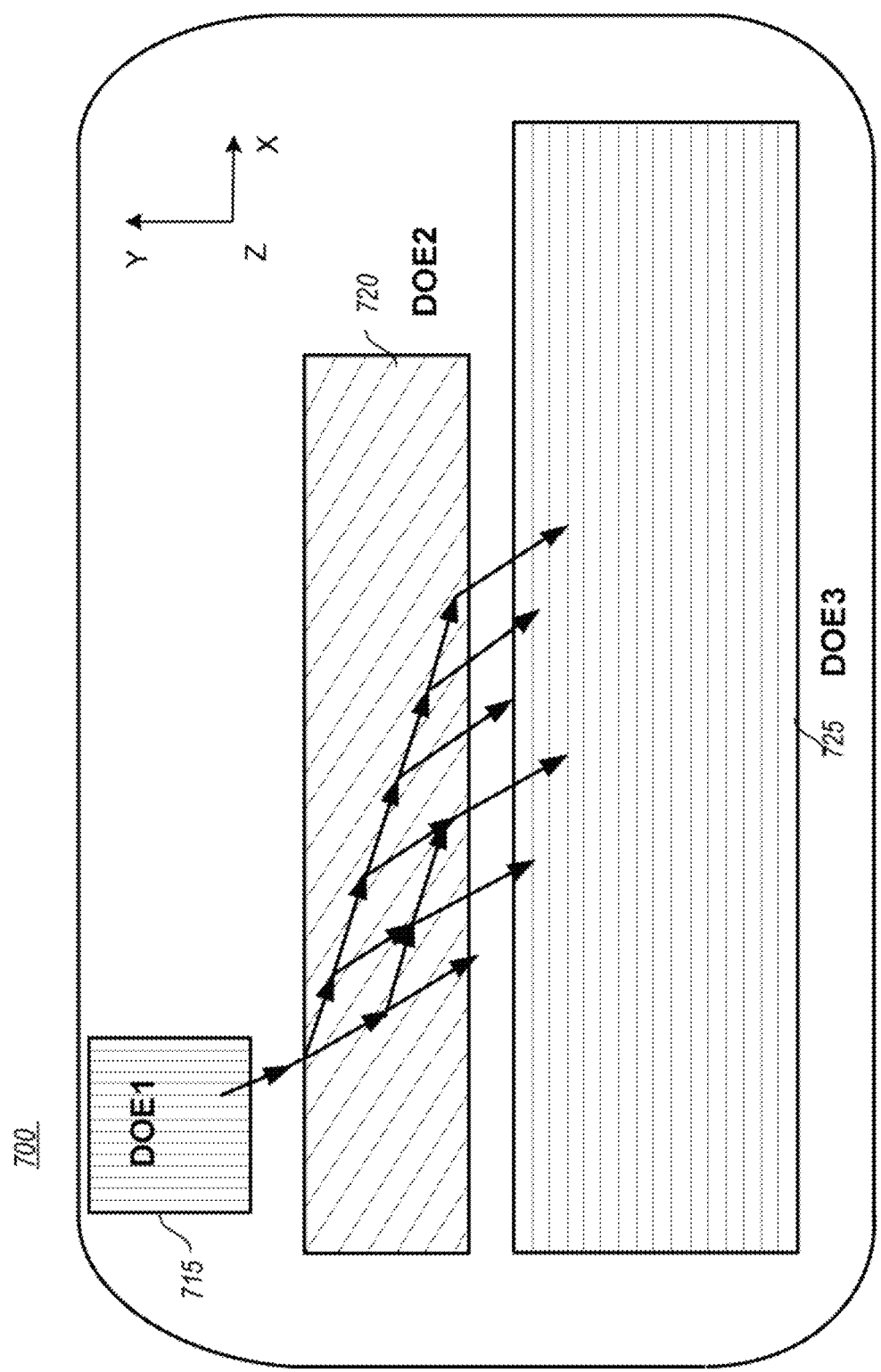
FIG. 7 illustrates a waveguide with even-order expansion.

Furthermore, the waveguide, as a beam-expanding device, can expand light waves in an even-order expansion process as well. FIG. 7 shows an output waveguide conducting an even-order expansion. The waveguide 700 includes DOEs 715, 720 and 725.

Light is incident upon the waveguide 700 in a Z direction, which is perpendicular to the X and Y directions. The first DOE 715 couples light into the waveguide 700, and redirects the light wave into the second DOE 720 at a top edge of DOE 720. The second DOE 720 expands the light in the X direction. The third DOE 725 further expands the light in the Y direction and couples the expanded light out from the waveguide 700 in the same Z direction.

As shown in FIG. 7, the second DOE 720 receives the light wave from the first DOE 715 at the top edge of the DOE 520. Note that in the odd-order expansion illustrated in FIG. 6A, the second DOE 520 receives the light wave at the left side edge. The choice of either odd-order expansion or even-order expansion depends on various design factors for the waveguide. Typically, a waveguide of odd-order expansion configuration tends to be smaller. An even-order expansion configuration, on the other hand, enables supplying the light wave at the top edge of the second DOE, which may be advantageous when there is a limitation on the width of the waveguide.

The light wave is reflected by the grating pattern in the DOE 720 multiple times before the light wave exits the DOE 720 at a bottom edge of the DOE 720. During the even-order expansion process, the second DOE 720 reflects the light an even number of times (including zero time) before redirecting the light into the third DOE 525. Similar to the odd-order expansion, over the process of multiple reflections between 0 and +1 orders, more of the light energy is converted to +1 order, which is redirected toward the third DOE 725.

As shown in FIG. 7, the second DOE 720 expands the light wave in the X direction. However, the second DOE 720 maintains the direction of its output light as the same of the direction of its input light. In other words, in the even-order expansion, the wave vectors of light waves before and after second DOE 720 are identical. Thus, the grating vector for the diffraction grating of the second DOE 720 does not impose limitation to diffraction vectors of other DOEs in the waveguide 700.

In the even-order expansion, the first DOE 715 can have, e.g., linear diffraction gratings on two sides of the DOE 715 (also referred to as "dual-sided linear grating"). The first diffraction grating on a first side (e.g., top side) of DOE 715 has a grating vector of $D_{1a}=(D_{x1a}, D_{y1a})$. The second diffraction grating on a second side (e.g., bottom side) of DOE 715 has a grating vector of $D_{1b}=(D_{x1b}, D_{y1b})$. The diffraction grating of the third DOE 725 has a grating vector of $D_3=(D_{x3}, D_{y3})$ The waveguide 700 satisfies the achromatic imaging condition, which means the incident light $(k_{x0}, k_{y0})$ matches the out-coupled light $(k_{x3}, k_{y3})$. The achromatic imaging condition is satisfied, if $mD_{1a}+nD_{1b}=\pm D_3$, wherein m and n are integer order numbers.

In some embodiments, the achromatic imaging condition can be expressed as a weighted vector summation of the grating vectors: $mD_{1a}+nD_{1b}+lD_3=0$, where the values m, n and l in the addends are integer weight values that represent diffraction orders to which the periodic diffraction patterns are designed to concentrate light energy (also referred to as "weighted summation rule"). In some embodiments, the integer weight values can be 0, −1 or +1. Higher diffraction orders, corresponding to integer numbers whose absolute values are larger than 1, are usually suppressed by the grating patterns.

In some embodiments, m=1 and n=0, or m=0 and n=1. Thus, the first DOE 715 has one diffraction grating with a wave vector $D_1=\pm D_3$. In other words, if the first DOE 715 and the third DOE 725 have the same length for the grating vectors (or the same grating period), the achromatic imaging condition is satisfied.

The design limitation of the grating vectors can be further relaxed, because the grating periods for first DOE 715 and third DOE 725 do not need to be equal. In some embodiments, m=1 and n=1, which means the first diffraction grating of the first DOE 715 reflects the light wave to +1 diffraction order, and then the second diffraction grating of the first DOE 715 reflects the light wave again to +1 diffraction order. Diffraction orders higher than the +1 diffraction order usually are less efficient and can create ghost image effects. Thus, when m=1 and n=1, a vector sum of the grating vectors of the diffraction gratings of the first DOE 715 either equals the grating vector of the third DOE 725, or is the exact opposite to the grating vector of the third DOE 725: $D_{1a}+D_{1b}=\pm D_3$. Particularly, in case of $-D_3$, the first and second diffraction gratings of the first DOE 715 and the diffraction grating of the third DOE 725 satisfy the summation rule: $D_{1a}+D_{1b}+D_3=0$.

Besides dual-sided linear grating, the first DOE 715 can have, e.g., crossed diffraction gratings on two sides of the DOE 715 (also referred to as "dual-sided crossed grating"). Thus, the first DOE 715 effectively have four diffraction gratings with four grating vectors. On a first side (e.g., top side) of the first DOE 715, there are two diffraction gratings that are crossed to each other and have grating vectors of $D_{1a}=(D_{x1a}, D_{y1a})$ and $D_{1b}=(D_{x1b}, D_{y1b})$. In other words, the grating pattern is periodic in two directions on the first side. On a second side (e.g., bottom side) of the first DOE 715, there are two diffraction gratings that are crossed to each other and have grating vectors of $D_{1c}=(D_{x1c}, D_{y1c})$ and $D_{1d}=(D_{x1d}, D_{y1d})$.

The waveguide 700 satisfies the achromatic imaging condition, which means the incident light matches the out-coupled light. The achromatic imaging condition is satisfied, if $mD_{1a}+nD_{1b}+oD_{1a}+pD_{1b}=\pm D_3$, wherein m, n, o, and p are integer order numbers.

Therefore, the weighted vector summation rule can be used to design DOEs of output waveguides. The diffraction gratings of DOEs follow the summation rule or the weighted summation rule, and therefore satisfies the achromatic imaging order. The summation rule or the weighted summation rule enables relaxed degrees of freedom for designing the configuration of the output waveguides with various properties of DOEs.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
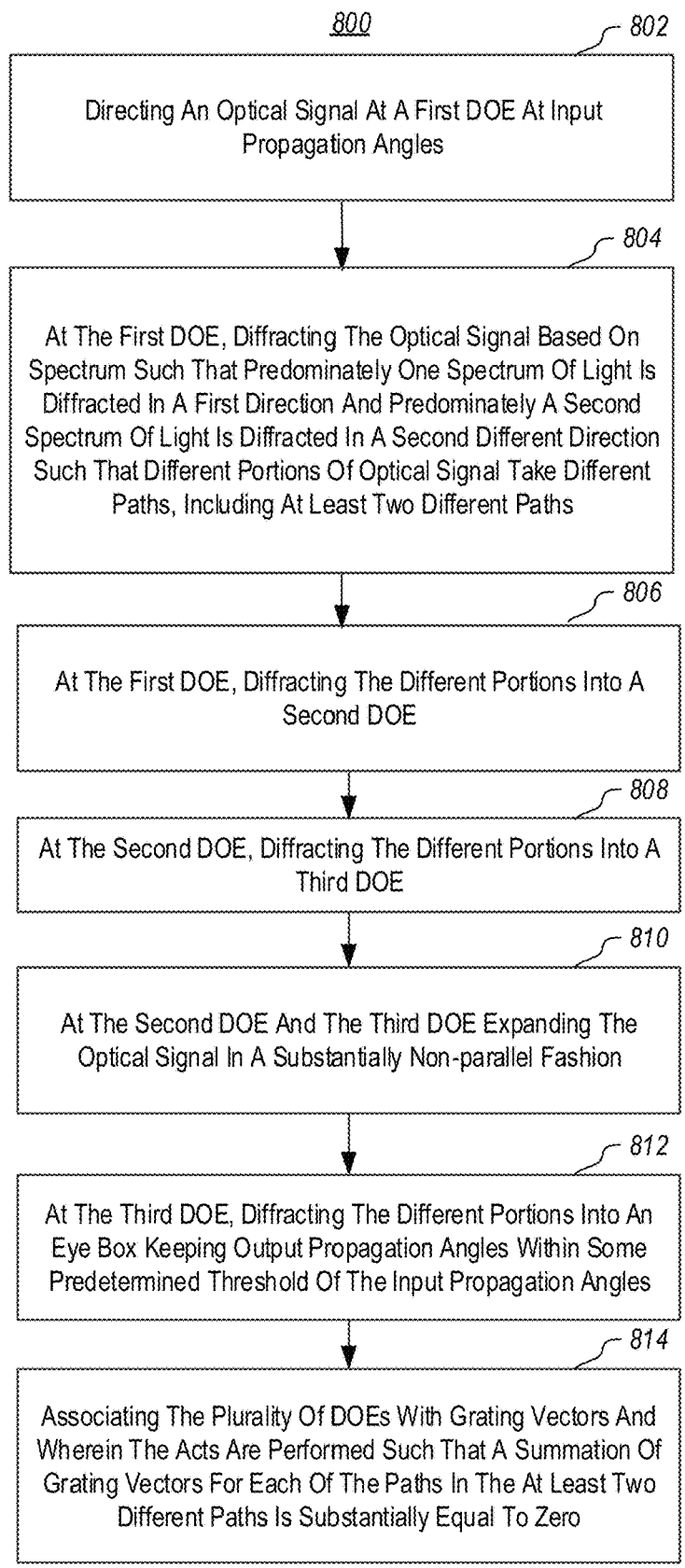
FIG. 8 illustrates a method of combining RGB optical signals in a single waveguide.

Referring now to FIG. 8, a method 800 is illustrated. The method 800 includes acts for combining RGB optical signals in a single waveguide. The waveguide includes a plurality of DOEs. The method includes directing an optical signal at a first DOE at input propagation angles (act 802).

The method 800 further includes at the first DOE, diffracting the optical signal based on spectrum such that predominately one spectrum of light is diffracted in a first direction and predominately a second spectrum of light is diffracted in a second different direction such that different portions of optical signal take different paths, including at least two different paths (act 804).

The method 800 further includes at the first DOE, diffracting the different portions into a second DOE (act 806).

The method 800 further includes at the second DOE, diffracting the different portions into a third DOE (808).

The method 800 further includes at the second DOE and the third DOE expanding the optical signal in a substantially non-parallel fashion; Expansions at DOE2 and DOE3 are substantially non-parallel. For example, embodiments may expand the pupil at DOE2 essentially in the vertical direction, and then at DOE3 in the horizontal direction during the outcoupling process (act 810).

The method 800 further includes at the third DOE, diffracting the different portions into an eye box keeping output propagation angles within some predetermined threshold of the input propagation angles. That is, an attempt is made to keep the output propagation angles substantially parallel to the input propagation angles to prevent distortion and/or other side-effects (act 812).

The plurality of DOEs are associated with grating vectors. The acts of method 800 are performed such that a summation of grating vectors for each of the paths in the at least two different paths is substantially equal to zero (act 814).

Note that being 'substantially equal to zero' is dependent on the display resolution of a device. In particular, the summation is substantially equal to zero so long as some predefined resolution is maintained. In some embodiments, this may mean that the output resolution of an outgoing optical signal must be the same as the input resolution of an incoming optical signal.

The method 800 may be practiced where diffracting the optical signal based on spectrum such that predominately one spectrum of light is diffracted in a first direction and predominately a second spectrum of light is diffracted in a second different direction such that different portions of optical signal take different paths, including at least two different paths is performed by the first DOE having a linear grating associated with a first grating vector on the front of the grating and a second grating vector on the back of the waveguide.

The method 800 may be practiced where diffracting the different portions into an eye box keeping output propagation angles within some predetermined threshold of the input propagation angles is performed by the third DOE being a linear grating with a first grating vector on the front of the waveguide and a second grating vector on the back of the waveguide.

The method 800 may be practiced where expanding the optical signal in a substantially non-parallel fashion and diffracting the different portions into a third DOE is performed by the second DOE having a linear grating with a first wing on the front and a second wing on the back of the waveguide, wherein the first wing and the second wings overlap.

The method 800 may be practiced where expanding the optical signal in a substantially non-parallel fashion and diffracting the different portions into a third DOE is performed by the second DOE having a linear grating with a first wing and a second wing on the front of the waveguide.

The method 800 may be practiced where expanding the optical signal in a substantially non-parallel fashion and diffracting the different portions into a third DOE is performed by the second DOE having a linear grating with a first wing and a second wing on the back of the waveguide.

The method 800 may be practiced where diffracting the optical signal based on spectrum such that predominately one spectrum of light is diffracted in a first direction and predominately a second spectrum of light is diffracted in a second different direction such that different portions of optical signal take different paths, including at least two different paths is performed by the first DOE having a cross grating associated with two distinct grating vectors.

The method 800 may be practiced where expanding the optical signal in a substantially non-parallel fashion and diffracting the different portions into a third DOE is performed by the second DOE having a cross grating associated with two distinct grating vectors.

The method 800 may be practiced where diffracting the different portions into an eye box keeping output propagation angles within some predetermined threshold of the input propagation angles is performed by the third DOE having a cross grating associated with two distinct grating vectors.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An optical device comprising:
 a single waveguide plate, the single waveguide plate comprising:
  a first DOE comprising an in-coupling element having at least two periods and orientations;
  a second DOE optically coupled to the first DOE, the second DOE comprising a plurality of expansion gratings, wherein at least one of the expansion gratings comprises a plurality of distinct wings, such that the second DOE comprises at least three distinct expansion wings; and a third DOE optically coupled to the second DOE in a fashion such that output from the at least three distinct expansion wings is directed into a single wing of the third DOE, the third DOE comprising an out-coupling grating having at least two periods and orientations.

2. The optical device of claim 1, wherein at least one of the first DOE and the third DOE comprise a linear grating associated with a first grating vector on a front of the waveguide plate and a second grating vector on a back of the waveguide plate.

3. The optical device of claim 1, wherein the second DOE comprises a linear grating with a first wing on a front of the waveguide plate and a second wing on a back of the waveguide plate, wherein the first wing and the second wing overlap.

4. The optical device of claim 1, wherein at least one of the wings in the plurality of wings comprises a linear grating.

5. The optical device of claim 1, wherein a first wing and a second wing of the second DOE comprise linear gratings on a back of the waveguide plate.

6. The optical device of claim 1, wherein the second DOE comprises a cross grating associated with two distinct grating vectors.

7. The optical device of claim 1, wherein the third DOE comprises a cross grating associated with two distinct grating vectors.

8. A method of displaying a large field of view in a near-eye display device, the method comprising:
    directing light from a light engine to a first DOE of a single waveguide plate, the first DOE comprising an in-coupling element having at least two periods and orientations causing at least two different spectra of wavelengths of light to be diffracted in different directions;
    directing the light from the first DOE to a second DOE of the single waveguide plate optically coupled to the first DOE, the second DOE comprising a plurality of expansion gratings, wherein at least one of the expansion gratings comprises a plurality of distinct wings, such that the second DOE comprises at least three distinct expansion wings, causing expansion of an exit pupil by pupil replication for at least one spectra of wavelengths of light; and
    directing the light from the at least three distinct expansion wings of the second DOE to a single wing of a third DOE of the single waveguide plate optically coupled to the second DOE, the third DOE comprising an out-coupling grating having at least two periods and orientations causing the different spectra of wavelengths of light to be recombined.

9. The method of claim 8, wherein the first DOE comprises a linear grating associated with a first grating vector on a front of the waveguide plate and a second grating vector on a back of the waveguide plate such that causing the at least two different spectra of wavelengths of light to be diffracted in different directions is performed using the first grating vector on the front of the waveguide plate and the second grating vector on the back of the waveguide plate.

10. The method of claim 8, wherein the third DOE comprises a linear grating associated with a first grating vector on a front of the waveguide plate and a second grating vector on a back of the waveguide plate such that recombining the different spectra of wavelengths of light is performed using the first grating vector on the front of the waveguide plate and the second grating vector on the back of the waveguide plate.

11. The method of claim 8, wherein the second DOE comprises an expansion grating with a first wing on a front of the waveguide plate and a second wing on a back of the waveguide plate, such that pupil replication is performed using the first wing on a front of the waveguide plate and a second wing on a back of the waveguide plate.

12. The method of claim 8, wherein at least one of the wings in the plurality of wings of the second DOE comprises a linear grating such that pupil replication is performed using the linear grating.

13. The method of claim 8, wherein a first wing and a second wing of the second DOE comprise linear gratings on a back of the waveguide plate such that pupil replication is performed using the linear gratings on the back of the waveguide plate.

14. The method of claim 8, wherein the third DOE comprises a cross grating associated with two distinct grating vectors such that recombining the different spectra of wavelengths of light is performed using the cross grating associated with two distinct grating vectors.

15. A near eye optical device, comprising:
    a light engine;
    a single waveguide plate optically coupled to the light engine, the single waveguide plate comprising:
        a first DOE comprising an in-coupling element having at least two periods and orientations;
        a second DOE optically coupled to the first DOE, the second DOE comprising a plurality of expansion gratings, wherein at least one of the expansion gratings comprises a plurality of distinct wings, such that the second DOE comprises at least three distinct expansion wings; and
        a third DOE optically coupled to the second DOE in a fashion such that output from the at least three distinct expansion wings is directed into a single wing of the third DOE, the third DOE comprising an out-coupling grating having at least two periods and orientations.

16. The near eye optical device of claim 15, wherein the first DOE comprises a single sided crossed grating.

17. The near eye optical device of claim 15, wherein the first DOE comprises a reflective component.

18. The near eye optical device of claim 15, wherein at least one of the wings in the plurality of wings comprises a linear grating.

19. The near eye optical device of claim 15, wherein a first wing and a second wing of the second DOE comprise linear gratings on a back of the waveguide plate.

20. The near eye optical device of claim 15, wherein the third DOE comprises a cross grating associated with two distinct grating vectors.

* * * * *